US008397058B1

(12) United States Patent
Ezawa et al.

(10) Patent No.: US 8,397,058 B1
(45) Date of Patent: Mar. 12, 2013

(54) SYSTEM AND METHOD FOR COMMUNICATION BETWEEN SMART CARDS

(75) Inventors: Kazuo J. Ezawa, Clinton, NJ (US); Dave Roberts, Warrington (GB); Michael Foster, Chipstead (GB); John Kelly, Sheffield (GB)

(73) Assignee: Mondex International Limited, London (GB)

( * ) Notice: Subject to any disclaimer, the term of this patent is extended or adjusted under 35 U.S.C. 154(b) by 3024 days.

(21) Appl. No.: 09/628,315

(22) Filed: Jul. 28, 2000

Related U.S. Application Data (60) Provisional application No. 60/146,103, filed on Jul. 28, 1999.

(51) Int. Cl.
  *H04L 29/06* (2006.01)
  *H04L 9/32* (2006.01)
  *H04L 9/00* (2006.01)
  *G06F 12/14* (2006.01)
  *G06F 7/04* (2006.01)

(52) U.S. Cl. ........ 713/155; 713/159; 713/161; 713/168; 713/178; 713/187; 726/9; 726/26; 380/277

(58) Field of Classification Search .................. 713/169, 713/170, 172, 155, 159, 161, 168, 178, 187; 726/9, 26; 380/277
See application file for complete search history.

(56) References Cited

U.S. PATENT DOCUMENTS

| 5,120,939 | A | * | 6/1992 | Claus et al. ................... 235/382 |
| 5,175,416 | A | * | 12/1992 | Mansvelt et al. ............. 235/379 |
| 5,307,411 | A | * | 4/1994 | Anvret et al. ................. 713/169 |
| 5,461,217 | A | * | 10/1995 | Claus ............................ 235/380 |
| 5,502,765 | A | * | 3/1996 | Ishiguro et al. ................ 705/67 |
| 5,544,246 | A | * | 8/1996 | Mandelbaum et al. ......... 705/65 |
| 5,602,915 | A | * | 2/1997 | Campana et al. ............. 380/277 |
| 5,649,118 | A | * | 7/1997 | Carlisle et al. ................. 705/41 |
| 5,649,195 | A | * | 7/1997 | Scott et al. .................... 707/201 |
| 5,710,814 | A | * | 1/1998 | Klemba et al. ................ 713/173 |
| 5,778,071 | A | * | 7/1998 | Caputo et al. ................. 713/159 |
| 5,867,577 | A |   | 2/1999 | Patarin |
| 6,125,349 | A | * | 9/2000 | Maher ............................ 705/1 |
| 6,216,015 | B1 | * | 4/2001 | Hymel ......................... 455/558 |
| 6,719,634 | B2 | * | 4/2004 | Mishina et al. ................ 463/42 |
| 6,805,296 | B2 | * | 10/2004 | Sakashita et al. ............. 235/487 |

FOREIGN PATENT DOCUMENTS

| EP | 0363122 | 4/1990 |
| NL | 1006833 | 2/1999 |

\* cited by examiner

*Primary Examiner* — Aravind Moorthy
(74) *Attorney, Agent, or Firm* — Baker Botts L.L.P.

(57) ABSTRACT

A method and system which provides communication between a first portable device and a second portable device. The first portable device stores a first sequence number and a first key, and the second portable device stores a second sequence number and a second key. Verification is performed using the first and second keys. The first sequence number is compared to the second sequence number. If the second sequence number is newer than the first sequence number, the first sequence number is set to have a value of the second sequence number if the verification succeeds. If the first sequence number is newer than the second sequence number, the second sequence number is set to have a value of the first sequence number if verification succeeds.

18 Claims, 8 Drawing Sheets

SYSTEM AND METHOD FOR COMMUNICATION BETWEEN SMART CARDS

CROSS-REFERENCE TO A RELATED APPLICATION

The present application claims priority from U.S. Patent Application Ser. No. 60/146,103, filed Jul. 28, 1999, the entire disclosure of which is incorporated herein by reference.

FIELD OF THE INVENTION

The present invention relates to a system and method for communicating between smart cards. In particular, the system and method utilize a scheme which allows an application provided on a smart card to be upgraded and/or expired, as well as to control the security and control parameters of the application provided on the smart card. This mechanism also enables the smart cards to check the data stored on each respective card to determine and control various parameters and/or applications stored in such card (e.g. such as time).

BACKGROUND INFORMATION

As the card industry progresses from the usage of the magnetic strip cards to the utilization of the smart cards, the ability to process the information provided on the card substantially increases.

When a transaction is requested using the conventional magnetic strip card, a host system must be contacted to authorize the transactions (e.g., credit/debit transactions); this is because such conventional magnetic strip card has no information processing capability thereon. In contrast, the smart card may utilize a mechanism (provided therein) to authorize the transaction. This mechanism does not have to reside only on the host system, and at least a portion thereof may be provided on the smart card. In this manner, the processing capability for authorizing the transaction can be moved from the host system to either the smart card or a balanced combination of the host system and the smart card.

As a result of the smart cards superior security, reliability and capacity, the market for the smart cards is rapidly expanding. Indeed, the ability of the smart cards to maintain the intelligent (e.g., executable) applications thereon, such as "access", "credit/debit", "electronic cash", etc. provides such expanding market. The existing smart cards utilize card authentication/verification methodologies to perform the transactions (e.g., cryptographic techniques). In particular, the conventional smart card can be authenticated either statically or dynamically.

With the static authentication, when the card is inserted into a transaction terminal, the smart card transmits a "digital signature" to such terminal. The digital signature contains information which uniquely identifies each smart card, e.g., the card serial number, manufacture ID, manufacture date, etc. Then, the transaction terminal decrypts the signature to determine if the smart card data is genuine. If so, the transaction process is continued; otherwise, it is terminated.

With the dynamic authentication, the transaction terminal generates random data (e.g., a seed), and requests the smart card to encrypt the random data. When the transaction terminal receives the encrypted random data from the smart card, the terminal decrypts this encrypted data. If the decrypted data is the same as the seed, then it is determined that the smart card is genuine. Such dynamic authentication is only possible with the smart cards due to the ability of the smart cards to perform the cryptography thereon.

When the smart card is utilized to facilitate the "electronic cash", it may be important to use the "risk managed" smart card application on such smart card. One of the key economic risk exposures of the smart card is that the electronic cash can be "counterfeit". Thus, it is important to minimize the impact of such counterfeit electronic cash, and to ensure the stability and utilization of the smart card.

It is preferable to exploit the on-chip data processing power of the smart card to the maximum extent by utilizing a smart card electronic cash risk management functionality on the smart cards. By installing the risk management functionality on a chip of the smart card, some of the critical risk management tasks are performed, at the time of the transaction, autonomously on the transacting smart cards.

One of the more important indications for many transactions is an indication of "time". This indication can be used to enforce the fact that the sequence of events should occur in an orderly manner. Currently, the smart cards access the host system to determine this time indication. However, there is no effective way to keep track of the time by the smart cards when the host system is not utilized by the cards. To enable the smart cards to determine certain operations (e.g., an expiration of a particular smart card), it may be preferable for the chip on the smart card to utilize a scheme where an approximate time indication can be obtained, without the necessity of connecting the smart card to the host system. Without using such scheme, if and when the smart card is subjected to an attack (e.g., an unauthorized request for the financial information is made), the smart card may be vulnerable to receiving particular data which may have been maliciously modified. With this modified data, the smart card may be utilized in a fraudulent manner.

SUMMARY OF THE INVENTION

The system and method according to the present invention provides the security to prevent, detect, contain, and/or recover from potential counterfeit or fraudulent activities. With this system and method, it is possible to perform efficient command, control and communication with distributed smart cards which may be active in the market. Indeed, the system and method can perform purse (e.g., data on the card) to purse transactions, communicating without requiring the use of a central authorization entity. Accordingly, it is possible to update, enhance, replace and/or modify a cryptographical security, a purse class structure (e.g., a restriction of the interactions between different types of purses), a purse limit, an on-chip risk management capability (e.g., a credit turnover limit), etc. on the smart card.

In an exemplary embodiment of the present invention, a method and system providing a communication between a first portable device (e.g. a smart card) having a first storage device and a second portable device (e.g., also a smart card) having a second storage device. This is done using, preferably, an authenticated system message. Such message may include a payload/command signed by an authenticated system message key (e.g., a global signing key). The first storage device stores thereon a first sequence number and a first key (e.g., a first global signing key), and the second storage device stores thereon a second sequence number and a second key (e.g., a second global signing key). The first sequence number is compared to the second sequence number. If the second sequence number is newer than the first sequence number, a verification is performed using the first and second keys. Then, the first sequence number is set to have a value of the second sequence number if the verification succeeds. It is also possible to execute the command/payload carried in the message.

The smart cards generally do not have internal clocks, and therefore do not have a concept of time. These cards can rely only on the card reading device (e.g., a merchant terminal, ATM, etc.) to receive the time as known by such device time (local time, untrusted time) information. A "Sense of Time" scheme according to the present invention provides a "trusted time" on each smart card (e.g., the purse). This scheme provides an exchange of the trusted time when the purse performs a transaction. For example, the trusted time can be exchanged with another transacting purse/card as part of the message being sent from one purse to another, (e.g., an encrypted message).

An embodiment of the system and method according to the present invention implements the "Sense of Time" scheme which utilizes an embedded trusted time provided within data that is associated with a value transfer protocol. The trusted time is transferred from purse/card to purse/card during the transactions. In another embodiment of the present invention, a "Sense of Time" global signing key can be utilized to sign the trusted time with a signature. When the purse/card receives a new trusted time, it authenticates the message before it accept the new time using its own "Sense of Time" global signing key.

In one such embodiment of the present invention, the method and system (e.g. a smart card) are provided to determine an approximate current time using the first and second cards. In particular, the first sequence number is compared to the second sequence number. The first sequence number is indicative of a first time provided on the first card, and the second sequence number is indicative of a second time provided on the second card. If the second time is newer than the first time, a verification is performed using the first and second global signing keys, and the first sequence number is set to have a value of the second sequence number if the verification succeeds.

Another embodiment of the method and system is also provided to determine the approximate current time. In this embodiment, the first sequence number is also compared to the second sequence number. The first sequence number is indicative of a first time provided on the first card, and the second sequence number is indicative of a second time provided on the second card. If the first time is older than the second time, the first sequence number is set to have a value of the second sequence number (i.e., the time provided on the second card). Thus, the "time" of the first card is updated.

The present invention is capable of providing the framework and capability to securely command, control, and communicate with some or all of the smart cards distributed in the market place whether or not these smart-cards are connected to their respective host systems. Accordingly, the present invention can provide a mechanism to deliver an application (or a "pay load" to each smart card (e.g., an active smart card) for renewing the respective card's security, updating the card's on-chip risk management scheme in a secure manner from a central command arrangement (e.g., a certificate authority). In addition, a reference point for time can be provided such as a "trusted" time can be provided from the central command arrangement for various uses on the smart card and/or the application (e.g., en enforcement card/application expiry, a resetting of the on-chip risk management parameters, etc.). Thus, an unnecessary external intervention or maintenance can be avoided which would make the system and method according to the present invention cost effective. One of the advantages of the present invention is that it can be applied to an operating system of the smart card, as well as to one, some or all of the applications on the smart card. The scheme according to the present invention enables a selective targeting of particular purses to apply re-customization procedures thereon. Thus, a flexible response to a potential threat to the smart card can be achieved. Furthermore, according to the present invention, the respective smart card may select a particular response (e.g., lock/lockout of the card) when a predetermined criteria is met. This system and method can be implemented as a separate security or risk management application on the smart card.

BRIEF DESCRIPTION OF THE DRAWINGS

Exemplary embodiments of the present invention will now be described in detail with reference to the accompanying drawings in which.

DETAILED DESCRIPTION

Figure 1:
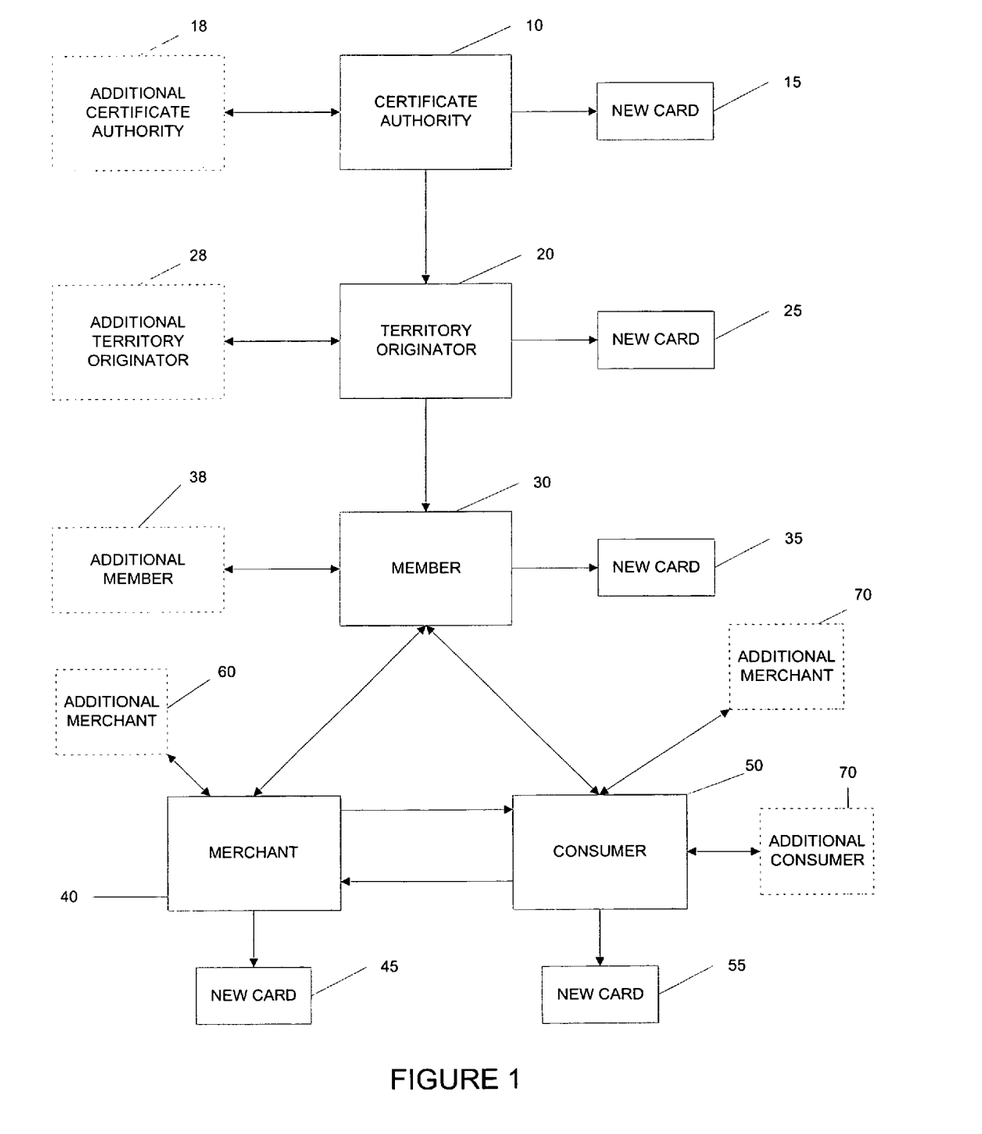
FIG. 1 shows a command, control and communication infrastructure utilized by the system and method according to the present invention.

FIG. 1 shows a command, control and communication ("C3") infrastructure utilized by the system and method according to the present invention. In particular, a certificate authority 10 (e.g., a Mondex® system) can transmit a message which is signed by a global authenticated system message ("ASM") key or by a trusted time message ("TIME") key to a territory originator 20. Such message shall be referred herein below as the ASM command and the TIME command, respectively. It is also possible for the certificate authority 10 to communicate with other certificate authorities (e.g., an additional certificate authority 18) by providing the ASM commands there between.

The certificate authority 10 should preferably be the only system (or one of a few systems) which is authorized to generate the ASM commands or the TIME commands. In this manner, the sensitive information provided in the ASM or TIME commands would be known only to the certificate authority 10. The territory originator 20 can function as a "central bank" providing electronic cash by regulating the electronic monetary activities (e.g., e-cash activities) in its territory. Preferably, a scheme which utilizes the smart cards for storing the electronic cash can be used to substitute the utilization of a "real" wallet which holds "real" money. The territory originator 20 issues electronic cash to member banks, and can also issue new smart cards 25 to a merchant 40 and/or a consumer 50. These smart cards 25 may include executable ASM and/or TIME applications thereon, along with other applications such as credit/debit applications. The territory originator 20 can also communicate with other territory originators (e.g., an additional territory originator 28). It should be understood that any reference herein to the smart cards is equally applicable to other portable processing devices.

The territory originator 20 passes the ASM commands to its member 30. In turn, the member 30 passes the ASM commands to its merchant 40 and/or consumer 50 when they interact with the member 30. At least portions of the ASM commands can be stored on the smart cards 25, 35, 45, 55 to enable these smart cards to communicate between one another. The member 30 is preferably a financial institution (e.g., a commercial bank and/or a bank branch) which transacts using "e-cash" to/from consumers and merchants. It is also possible for the member 30 to transact with other members, e.g., an additional member 38, using "e-cash" or some other way to transact electronically. The member 30 can also issue smart cards 35 (which are the same as or similar to the smart cards 25 described above) to the merchant 40 and/or the consumer 50.

The merchants can transact with the consumer 50, and with other merchants (e.g., the additional merchant 60). The consumer 50 can transact with the member 30, the merchant 40 and/or the additional consumer 70. Such transactions are accomplished on a "chip-to-chip" transaction basis. In particular, it is possible to provide the electronic communications between the chips of the smart cards (or other portable processing devices) without requiring a connection of these smart cards to a host server. Thus, it is possible to transmit the ASM command from one smart card to another in a location where the transaction takes place, without the need for providing an intermediary host server to facilitate such transfer. For example, the merchant 40 can transmit and/or receive the electronic monetary funds (e.g., "e-cash") to and from the consumer 50 for a particular transaction. Such transaction may be a payment for a specific service, or a refund to the consumer 50 for returning a damaged item. In addition, the member 40 can transact with the additional member 60.

A. Authenticated System Message (ASM) Handshaking Scheme

Figure 2:
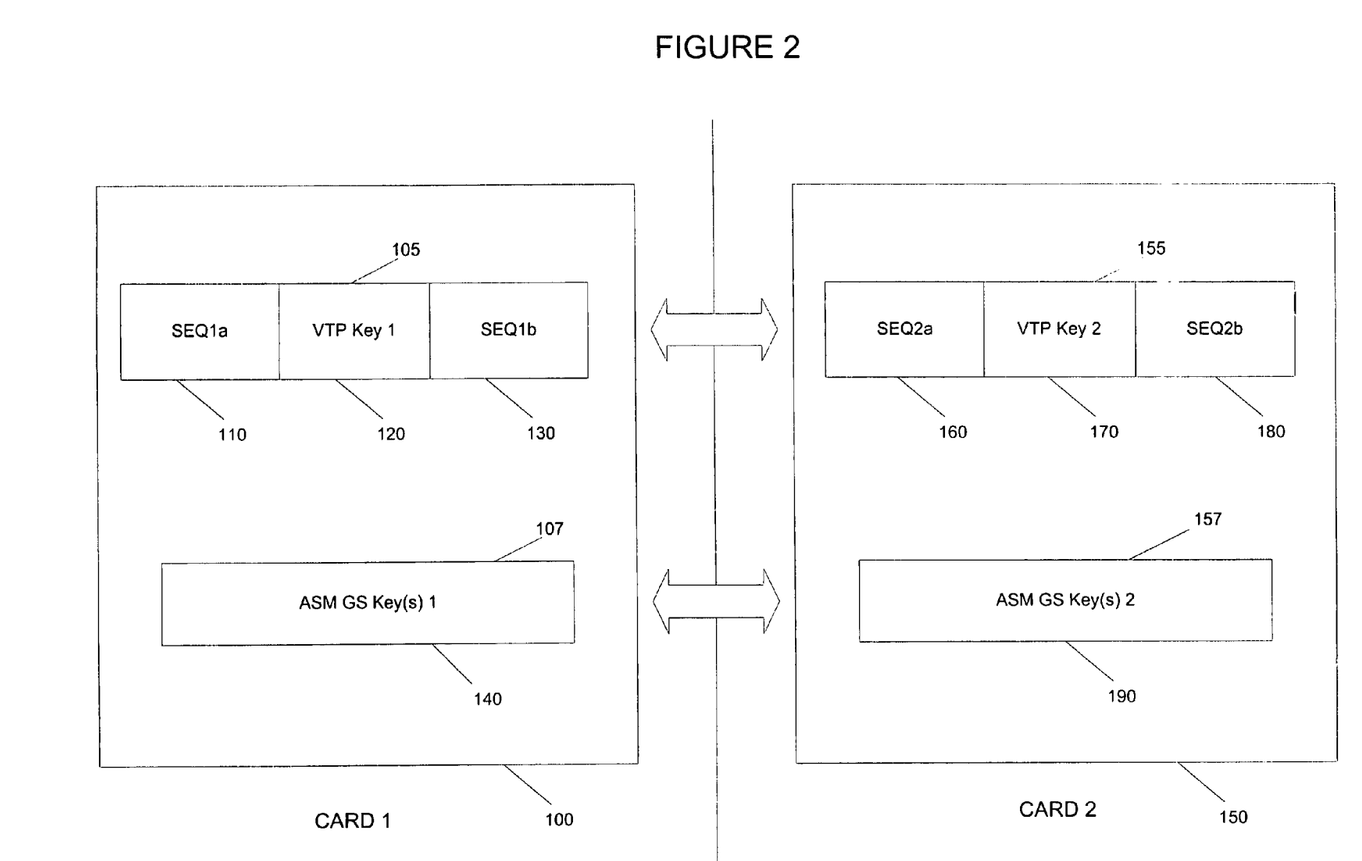
FIG. 2 shows an exemplary embodiment of the system according the present invention, in which two smart cards are in communications with one another using an authenticated system message ("ASM").

Using the present invention, it is possible to change or verify the parameters and/or data provided on the chip of the smart card or of other portable processing devices (e.g., remotely and securely) by providing the ASM commands to the smart cards or devices. FIG. 2 shows an exemplary embodiment of the system according to the present invention which utilizes the ASM scheme. In particular, each smart card 100, 150 (or portable processing devices) shown in FIG. 2 includes a chip which stores certain information for the respective smart card. The chip of the first smart card 100 stores and maintains thereon first data 105 and second data 107 for the first card 100, while the chip on the second card 150 stores and maintains thereon first data 155 and second data 157 for the second card 150. The first data 105 of the first card 100 includes a first number 110 (e.g., a first sequence number $SEQ1a$), at least one value transfer protocol key (the "VTP Key 1") 120, and a second number 130 (e.g., a second sequence number $SEQ1b$). The second data 107 preferably has at least one ASM global signing key 140 (the "ASM GS Key 1").

As with the first card 100, the first data 155 of the second card 150 also includes its own first number 160 (e.g., a first sequence number $SEQ2a$), at least one value transfer protocol key (the "VTP Key 2") 170, and a second number 180 (e.g., a second sequence number $SEQ2b$). In addition, the second data 157 of the second card 150 has at least one ASM global signing key 190 (the "ASM GS Key 2"). Preferably, each of the ASM GS Key 1 and the ASM GS Key 2 includes a public key portion and a private key portion, i.e., a public-private key pair. Such key pairs are is generally used for encrypting and decrypting data, and are well known to those having ordinary skill in the art. It should be understood that each of the first and second global signing keys 140, 190 may also be a global cryptographic key. Such cryptographic key can be used for providing verifications, signatures and/or encryptions, and may be symmetric or asymmetric.

The first and second sequence numbers of each of the smart card 100, 150 (i.e., $SEQ1a$, $SEQ1b$, $SEQ2a$, $SEQ2b$, respectively) are provided as ASM sequence number blocks. Thus, each sequence number is unique so as to avoid multiple applications of the same message. Indeed, the first and second sequence numbers can be hash values. The VTP Key 1 and the VTP Key 2 are also a unique public and private key pair, i.e., the VTP key on each smart card is different from all VTP Keys provided on other smart cards. According to a preferred embodiment of the present invention, at least one of these ASM number blocks is provided between the data blocks of the VTP Keys (e.g., VTP Key 1 and VTP Key 2), i.e., "sprinkled" between the VTP Keys.

In addition, each of the sequence numbers may have the values that do not necessarily increasing in a monotonic manner so as to reflect that a particular sequence number is newer than another sequence number. For example, such value can be decoded using modulo of one thousand so as to provide a sequence number. In addition, an integer multiple of a thousand may reveal a target code.

When the transaction is initiated between the first card 100 and the second card 150, the first sequence number $SEQ1a$ and/or the second sequence number $SEQ1b$ of the first card 100 are associated with the VTP Key 1 (either before the transaction or at the time thereof). The first sequence number $SEQ2a$ and/or the second sequence number $SEQ2b$ of the second card 150 are associated with the VTP Key 2. For example, the first sequence number of each of the first and second cards 100, 150 may be utilized for "non-reset" actions on the smart cards. The first sequence number (e.g., $SEQ1a$, $SEQ2a$) is generally used in emergency cases, and possibly may require the utilization of the respective ASM GS Key for a verification. On the other hand, the second sequence number of the first and second smart cards 100, 150 can be used for a "reset" action (such as resetting the parameters provided on the chip). The second sequence number (e.g., $SEQ1b$, $SEQ2b$) is generally provided for a routine maintenance, and does not require the ASM GS Key exchange (and thus requires no verification). When a communication occurs between the first card 100 and the second card so as to initiate a transaction, the sequence number and the associated VTP Key are bundled together seamlessly in one card, and transmitted to the other card.

Generally, each of the first card 100 and the second card 150 may be electronically connected to one another via, e.g., a smart card reading arrangement (e.g., a Mondex® card reading device which is not shown in the drawings for the sake of simplicity). Such arrangement may include a power source for providing the necessary power to each of the smart cards 100, 150. In addition, the smart card reading arrangement can facilitate the communication between the smart cards connected thereto. Using the provided power, the processor provided on the chip of the connected smart card can execute instructions, and transmit and/or receive data to the host complete or another smart card (as well as receive the data therefrom). The smart card reading arrangement described above are generally known to those having ordinary skill in the art.

Figure 3:
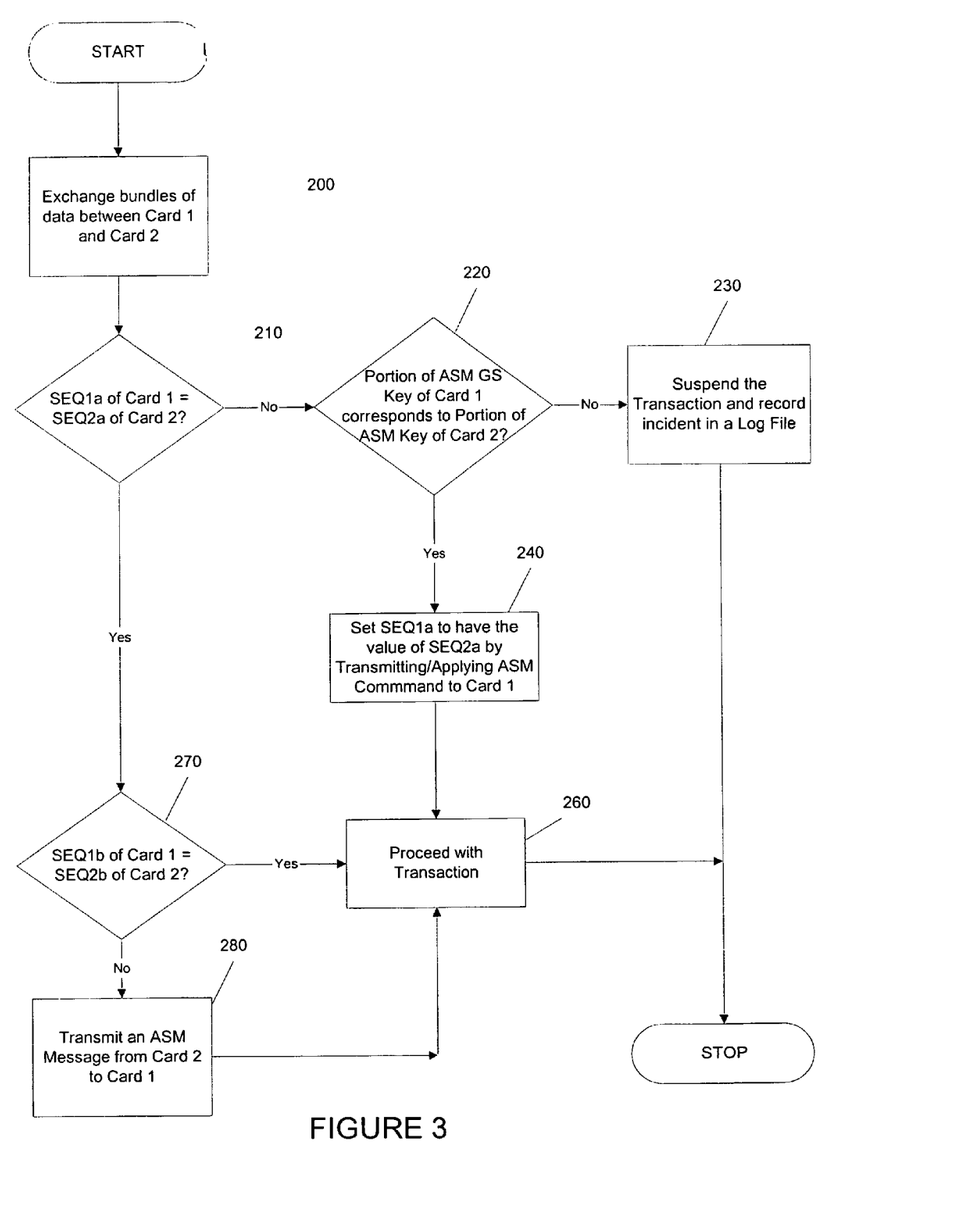
FIG. 3 shows an exemplary embodiment of the method according the present invention which utilizes ASM and the system of FIG. 2.

FIG. 3 shows an exemplary embodiment of the method according to the present invention which utilizes the above-referenced data on the smart cards and the ASM scheme. In step 200, the first card 100 and/or the second card 150 initiate the transaction. At that time, the first data 105 of the first card 100 (i.e., the first sequence number SEQ1$a$, the VTP Key 1, and the second sequence number SEQ1$b$) and the first data 155 of the second card 150 (i.e., the first sequence number SEQ2$a$, the VTP Key 2, and the second sequence number SEQ2$b$) are exchanged, e.g., via the smart card reading arrangement. In step 210, the chip of either the first card 100 and/or the second card 150 determines if the first sequence number SEQ 1$a$ of the first card 100 is equal to the first sequence number SEQ2$a$ of the second card 150.

If the first sequence numbers of the first and second cards 100, 150 are not equal, a verification is performed in step 220 (by the first card 100 and/or the second card 150) to determine if at least a portion of the ASM GS Key 1 of the first card 100 corresponds to at least a portion of the ASM GS Key 2 of the second card 150. For example, the portion of each of the ASM AG Keys being compared is a public key portion. In an exemplary case, the first sequence number SEQ2$a$ of the second card 150 is newer than the first sequence number SEQ 1$a$ of the first card 100. Thus, if the verification fails (i.e., the respective portions do not correspond), the transaction is suspended, this failure is recorded in an incident log (step 230), and the communication between the cards can be terminated. The incident log may be resident on the chip of the first card 100, the chip of the second card 150 and/or a memory arrangement of the host system. In this scenario, if the verification in step 220 succeeds (i.e., the respective portions correspond to one another), the first sequence number SEQ1$a$ of the first card 100 is modified to have the first sequence number SEQ2$a$ of the second card 150 by, e.g., transmitting the ASM command (or applied) from the second card 150 to the first card 100 (e.g., to provide a particular e-cash amount) in step 240, and the transaction is continued (step 260).

If, in step 210, the first sequence numbers SEQ1$a$, SEQ2$a$ of the first and second cards 100, 150 are equal, it is determined (using the first card 100 and/or the second card 150) if the second sequence number SEQ1$b$ of the first card 100 is equal to the second sequence number SEQ2$b$ of the second card 150 (step 270). If so, the transaction is continued without sending the ASM command (step 260). Otherwise, the ASM command is transmitted from the second card 150 to the first card 100 (step 280), and the transaction is continued (step 260).

The above exemplary scheme prevents an unauthorized modification of the smart cards since it is unlikely for a counterfeiter to dissect the first data of the respective smart card (e.g., the first data 107 which includes the first sequence number SEQ1$a$, the VTP Key 1, the second sequence number SEQ1$b$ of the first card 100), and counterfeit it. In addition, the certificate authority 10 does not provide a global signing key (which is necessary for the ASM verification) to the counterfeiter. Thus, by using the scheme described above, the data stored on the smart cards cannot be modified by the counterfeiter.

For example, in a situation where the counterfeiter modifies the data on the smart card (e.g., the e-cash amount), he/she can potentially transfer a counterfeit value to the legitimate purses. However, once a response is initiated by sending the ASM command (e.g., by transmitting the first sequence number SEQ2$a$ to the first card 100 to be the first sequence number SEQ1$a$ of the first card 100), the counterfeit purse (i.e., the counterfeit data) encounters the legitimate purse with the updated ASM sequence number. As described above with reference to FIG. 3, the transaction fails, at least because the counterfeit purse does not have a global signing key.

Using the system and method according to the present invention which utilize the above described ASM scheme, it is possible to provide a dynamic customization of the on-chip parameters, if necessary, when one smart card contacts another smart card (e.g., communicating between the purses of the respective smart cards). It is also possible to reset the on-chip parameters, and to facilitate the loading/unloading of related applications unto the chips of the smart cards, and to update the security on the chip.

Figure 4:
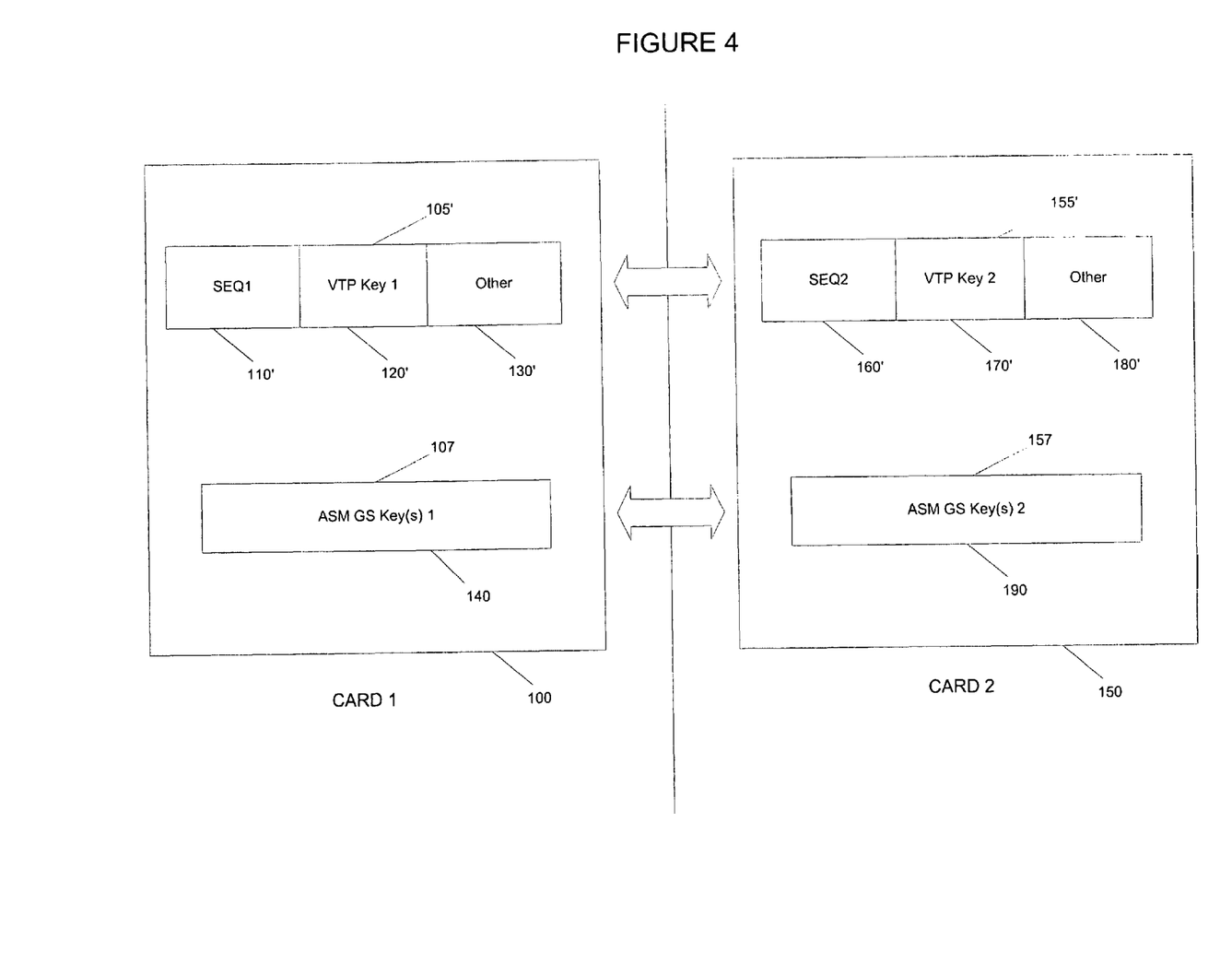
FIG. 4 shows another embodiment of the system according the present invention in which two smart cards are in communications with one another using ASM.

FIG. 4 shows another exemplary embodiment of the system according to the present invention which utilizes the ASM scheme. The system shown in FIG. 4 is similar to the system illustrated in FIG. 2. However, the first and second data 105', 155' of FIG. 4 have different formats from the formats of the first and second data 105, 155 of FIG. 2, respectively.

In particular, while the first data 105' includes a first number 110' (e.g., a sequence number SEQ1) and at least one value transfer protocol key (the "VTP Key 1") 120', the first data 105' does not have to include a second number 130 illustrated in FIG. 2. Indeed, the second number 130' of the first data 105' is indicated as "Other" in FIG. 4, and is not necessarily a second sequence number. In this embodiment, the second data 107 also has at least one ASM global signing key 140 (the "ASM GS Key 1") which has been described in greater detail above.

Similarly, the second data 155' includes a first number 160' (e.g., a sequence number SEQ2) and at least one value transfer protocol key (the "VTP Key 2") 170', but does not have to include a second number 180 illustrated in FIG. 2. As provided in FIG. 4, the second number 170' of the second data 155' is also indicated as "Other" in FIG. 4, and is not necessarily the second sequence number. Furthermore, the second data 157 has at least one ASM global signing key 190 (the "ASM GS Key 2"). The details of the format and possible contents of the ASM GS Key 1 and ASM GS Key 2 have been described above in greater detail. The sequence numbers of each of the smart cards 100, 150 of this embodiment (i.e., SEQ1, SEQ2) can also be provided as the ASM sequence number blocks, and thus each sequence number is unique so as to avoid multiple applications of the same message, i.e., hash values. A detailed description of the sequence numbers is provided above with reference to FIG. 2.

In this exemplary embodiment, the sequence number SEQ1 of the first data 105' is associated with the VTP Key 1, and the sequence number SEQ2 of the second data 155' is associated with the VTP Key 2 (either before the transaction or at the time thereof). When the communication occurs between the first card 100 and the second card to initiate the transaction, the ASM sequence number and VTP Key are bundled together seamlessly, and transmitted to the other purse (i.e., the smart card).

Figure 5:
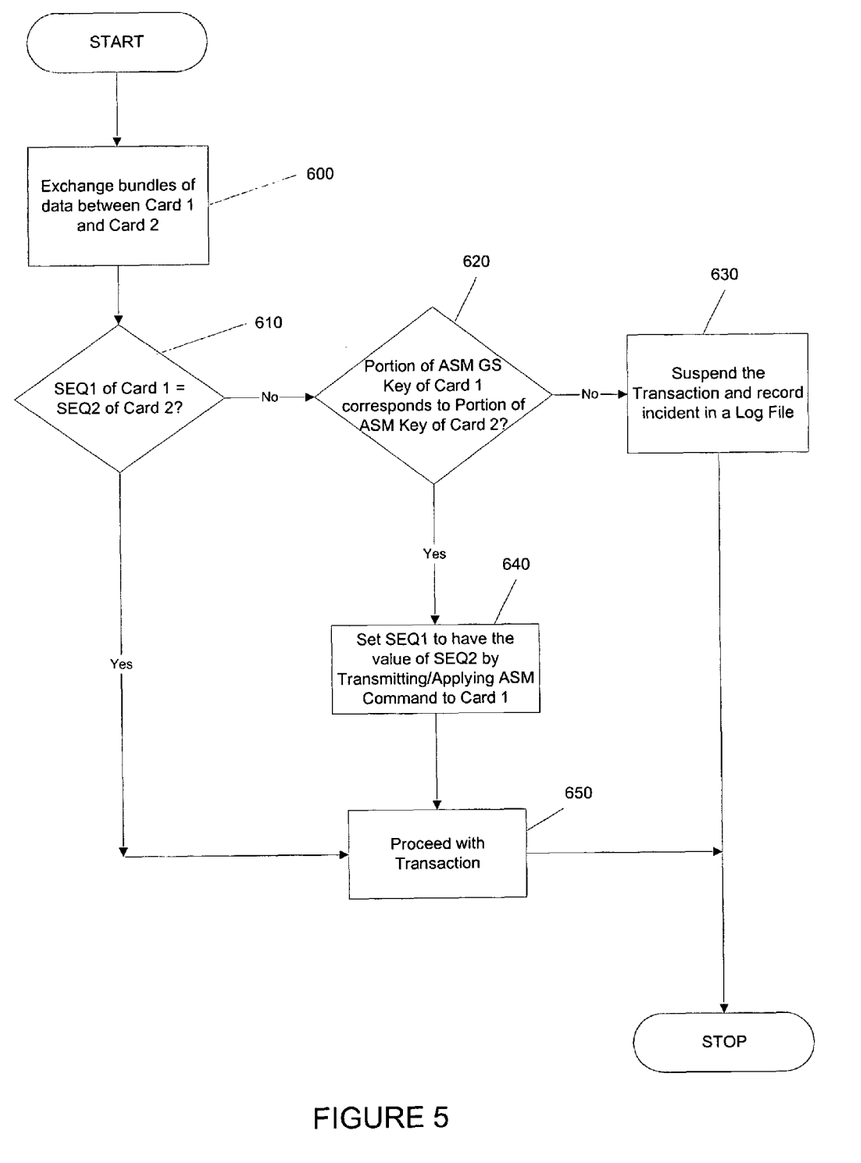
FIG. 5 shows an exemplary embodiment of the method according the present invention which utilizes ASM and the system of FIG. 4.

FIG. 5 shows another exemplary embodiment of the method according to the present invention which utilizes the above-referenced data on the smart cards and the ASM scheme illustrated in FIG. 4. In step 600, the first card 100 and/or the second card 150 initiate a transaction. At that time, the sequence number SEQ1 and the VTP Key 1 of the first data 105' of the first card 100 and the sequence number SEQ2 and the VTP Key 2 of the second data 155' of the second card 150 are exchanged, e.g., via the smart card reading arrangement. In step 610, either the first card 100 and/or the second card 150 determines if the sequence number SEQ1 of the first card 100 is equal to the sequence number SEQ2 of the second card 150.

If the sequence numbers SEQ1, SEQ2 of the first and second cards 100, 150 are not equal, a verification is performed in step 620 (by the first card 100 and/or the second card 150) to determine if at least a portion of the ASM GS Key of the first card 100 corresponds to at least a portion of the ASM GS Key 2 of the second card 150. As described above for FIG. 3, the portion of each of the ASM AG Keys being compared can be a public key portion. In an exemplary case, the sequence number SEQ2 of the second card 150 is newer than the sequence number SEQ1 of the first card 100. Thus, if the verification fails (i.e., the respective public key portions do not correspond), the transaction is suspended, this failure is recorded in the incident log (step 630), and the communication between the cards is terminated. However, if the verification in step 620 succeeds (i.e., the respective public key portions correspond to one another), the sequence number SEQ1 of the first card 100 is modified to have the sequence number SEQ2 of the second card 150 (step 640) by transmitting an ASM command from the second card 150 to the first card 100 (e.g., to provide a particular e-cash amount and/or payload). Thereafter, the transaction is continued (step 650). If, in step 610, the sequence numbers of the first and second cards 100, 150 correspond to one another, the transaction is also continued (step 650).

In yet another exemplary embodiment of the system and method of the present invention, it is possible to ensure that the ASM Keys (i.e., ASM GS Key 1, ASM GS Key 2, etc.) are used only once for a respective card. For example, it is possible to generate a particular number (e.g., twelve) of hashed sequence numbers, and a corresponding number of the ASM keys. Then, the hashed sequence numbers are associated with the corresponding ASM keys. An exemplary table showing the hashed sequence numbers and the ASM Key correspondence is provided below.

| Hashed Sequence # | ASM keys |
|---|---|
| Default | No Key |
| Seq. No. 1 | Key 1 |
| ... | ... |
| Seq. No. 12 | Key 12 |

If a default sequence number is used, no ASM key are invoked. In this embodiment, only when the first card 100 and/or the second card 150 encounter a different sequence number, such card checks the sequence number-key pair, and the communication between the cards 100, 150 is initiated using the appropriate key (e.g., when the sequence number is invoked, Key 1 is used for the authentication with the transacting purse/card). When the transacting purse encounters a new purse (i.e. a new card), only one communication handshake can be performed with Key 1 between the two cards. The new ASM command is issued with a different sequence number, and a new corresponding ASM key is necessary to perform the communication handshake between the cards. One of the advantages of associating the sequence numbers which correspond to the ASM keys is that for each ASM command, a different ASM key must be used (i.e., only once) between the two purses/cards. This exemplary embodiment of the present invention prevents a counterfeit ASM key to be used more than once, e.g., by using the ASM key only once. Otherwise, if a single global ASM key is used, this global ASM key is utilized for the communication handshake each time the ASM command is issued. In addition, it is possible to limit the number of the ASM commands that can be issued for each card. In the example discussed above, only twelve (12) ASM commands can be issued over the life of the particular purse/card.

B. "Sense of Time" Scheme

There are two ways to implement the "Sense of Time" scheme which shall be described below in greater detail. To summarize, an exemplary embodiment of the method according to the present invention utilizes an embedded "trusted" time within a value transfer protocol (e.g., a crypto-signature block) in the storage device of a particular card. When the particular card transacts with another card (e.g., the purse), the trusted time is provided from the original card to the other card with which the original card transacts. Thus, the migration of the "trusted" time occurs from the chip of one card to the chip of the other card.

Another embodiment of the method according to the present invention utilizes a "Sense of Time" global signing key to sign the trusted time with a "signature". When the purse/card receives a new trusted time, it authenticates the message before accepting the new time using its own "Sense of Time" global signing key. Using the "Sense of Time" scheme as described in further detail below, it is possible to enforce the expiration requirements of the purse/card, reset on-chip risk management parameters and/or other parameters on the purse/card, etc. The trusted time can be propagated using an ASM distribution channel or via an issuance of new cards.

The TIME commands can be transmitted using the C3 infrastructure as shown in FIG. 1. For example, the TIME command can be passed from the certificate authority 10 to the territory originator 20 when they transact. Then, the territory originator 20 may pass the TIME command to the member 30 (e.g., the financial institution). Thereafter, the member 30 can pass the TIME command to their consumer(s) 50 and/or merchant(s) 40 when they interact with each other. When a new purse/card is issued, it includes the latest trusted time, and when the new purse transacts with other purse, it transmits the latest time to the transacting purse. The communication between the certificate authority 10 and territory originator 20, as well as between the territory originator 20 and their respective member(s) 30 can be activated on demand, and thus, the trusted time can also be provided on demand.

Figure 6:
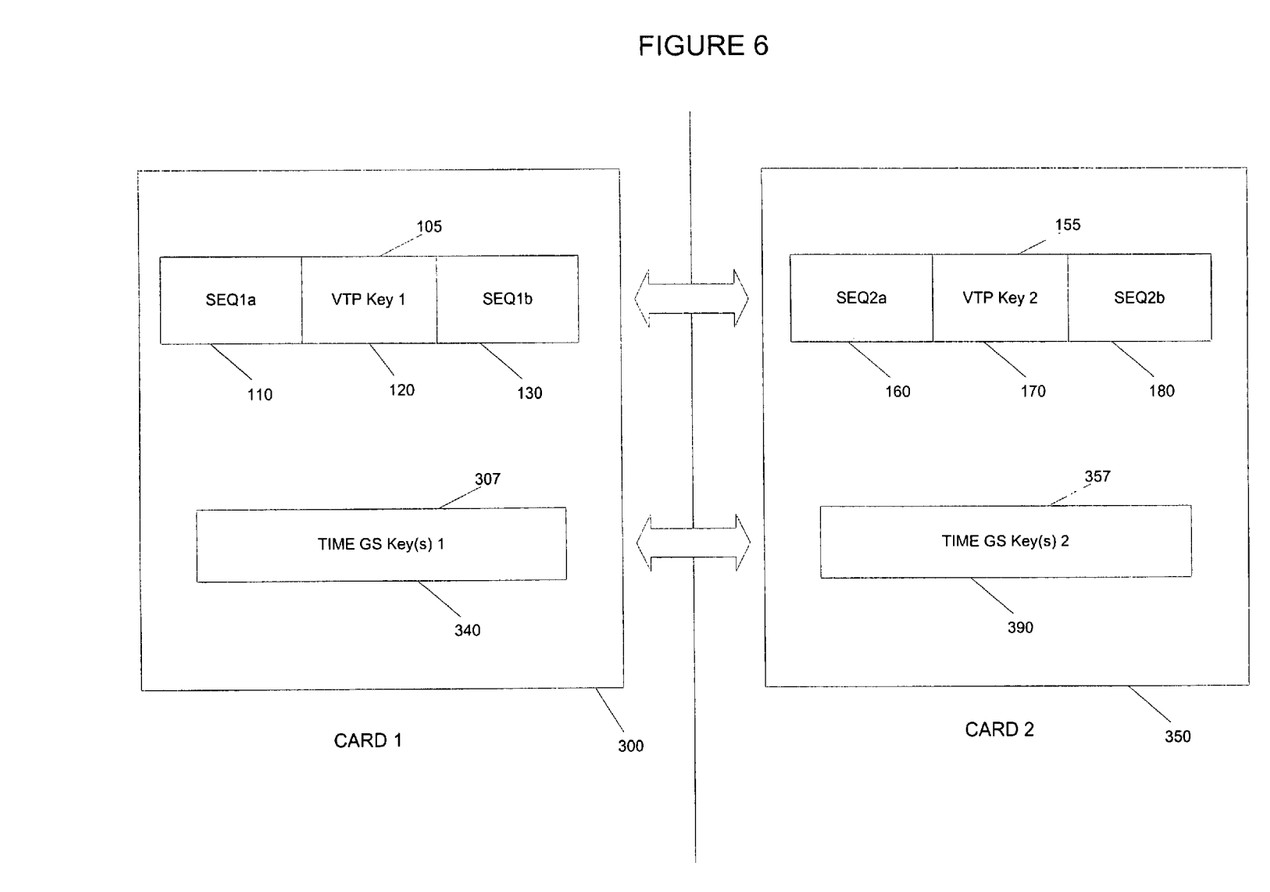
FIG. 6 shows yet another exemplary embodiment of the system according the present invention in which two smart cards are in communications with one another to determine a "trusted" time.

FIG. 6 shows an exemplary embodiment of the system according to the present invention which utilizes the "Sense of Time" scheme. The smart cards 300, 350 shown in FIG. 6 include data similar to the data illustrated in FIG. 2. The only difference is that the second data 107, 157 of the first and second cards 300, 350, respectively are different from the second data 307, 357 of the first and second cards 300, 350, respectively. In particular, each of the second data 307, 357 include at least one TIME global signing key 340, 390 (i.e., the TIME GS Key 1 and TIME GS Key 2). In addition, the second sequence numbers SEQ1$b$, SEQ2$b$ have the most recent time data for the respective cards. It is also possible to utilize other sequence numbers (e.g., SEQ1$a$, SEQ2$a$) to have the most recent time data. Furthermore, the TIME global signing keys are not used in one of the embodiments described below. This embodiment can also be implemented with the embodiment of the method of the present invention shown in FIG. 5 which utilizes the ASM scheme. Indeed, since the embodiment shown in FIG. 5 does not utilize the second sequence numbers SEQ1b, SEQ2b, and the embodiment shown in FIG. 7 does not use the first sequence numbers SEQ1a, SEQ2a, it is possible to implement the ASM and TIME schemes simultaneously using the embodiments shown in, e.g., FIGS. 5 and 7.

Figure 7:
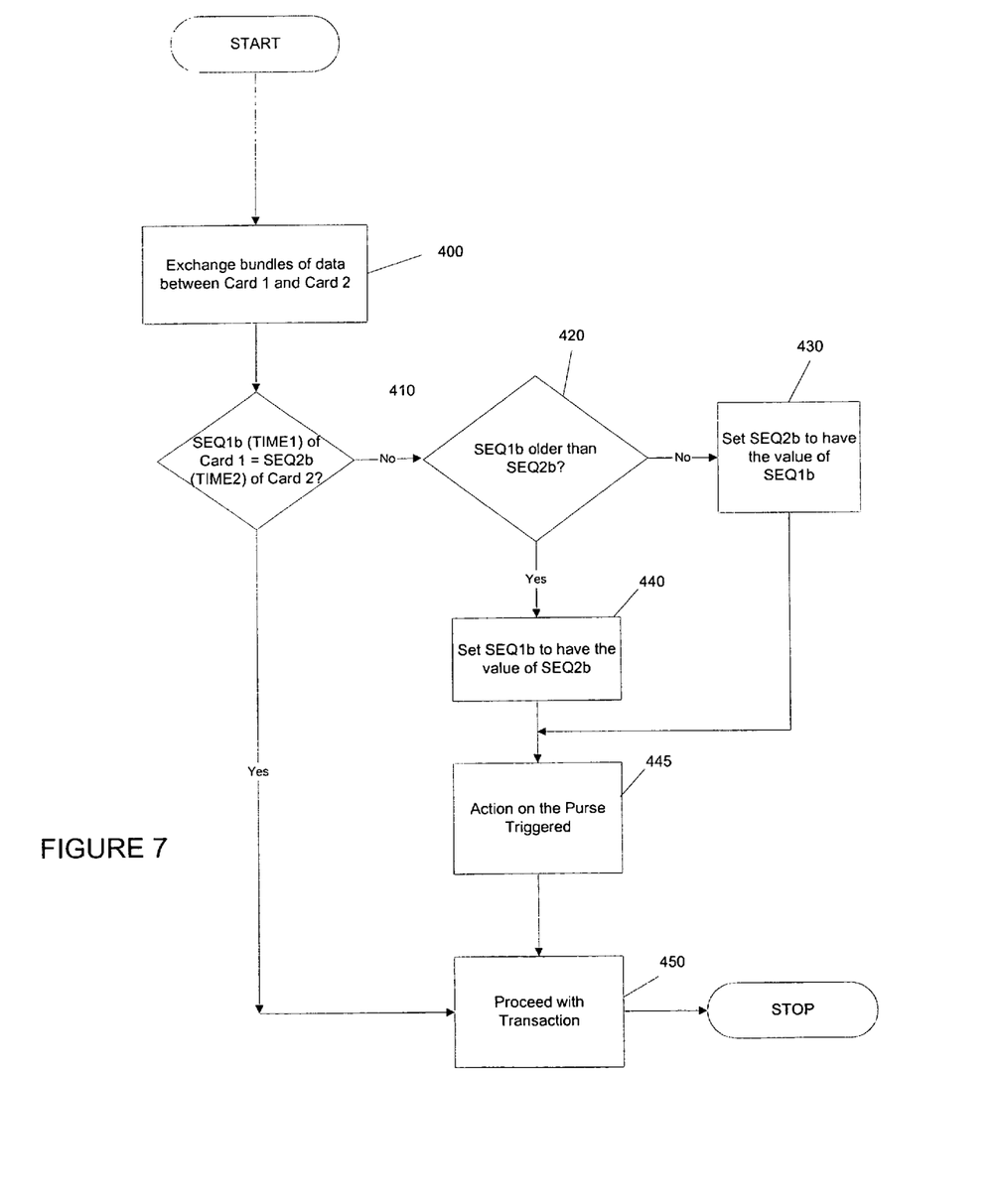
FIG. 7 shows an exemplary embodiment of the method according the present invention for determining the trusted time which utilizes the system of FIG. 6.

FIG. 7 shows a first exemplary embodiment of the method according to the present invention which utilizes the "Sense of Time" scheme. In step 400, the first card 300 and/or the second card 350 initiate a transaction. At that time, the first data 105 of the first card 300 (i.e., the first sequence number SEQ1a, the VTP Key 1, the second sequence number SEQ1b) and the first data 355 of the second card 350 (i.e., the first sequence number SEQ2a, the VTP Key 2, the second sequence number SEQ2b) are exchanged, e.g., via the smart card reading arrangement described above. In step 410, either the first card 300 and/or the second card 350 determine if the second sequence number SEQ1b of the first card 300 is equal to the second sequence number SEQ2b of the second card 350.

If the second sequence numbers of the first and second cards 300, 350 are not equal, in step 420, it is determined (by the first card 300 and/or the second card 350) if the second sequence number SEQ2b of the second card 350 is older than the second sequence number SEQ1b of the first card 300, i.e., the time of the second card 350 is older than the time of the first card 300. If so, the second sequence number SEQ2b of the second card 350 is set to have the value of the second sequence number SEQ1b of the first card 300 (step 430). Otherwise, the second sequence number SEQ1b of the first card 300 is set to have the value of the second sequence number SEQ2b of the second card 350 (step 440). Then, if the trusted time triggers a particular action, that action is performed in step 445. Then, (unless the action is step 445 halts the operation) the transaction is proceeded in step 450.

Figure 8:
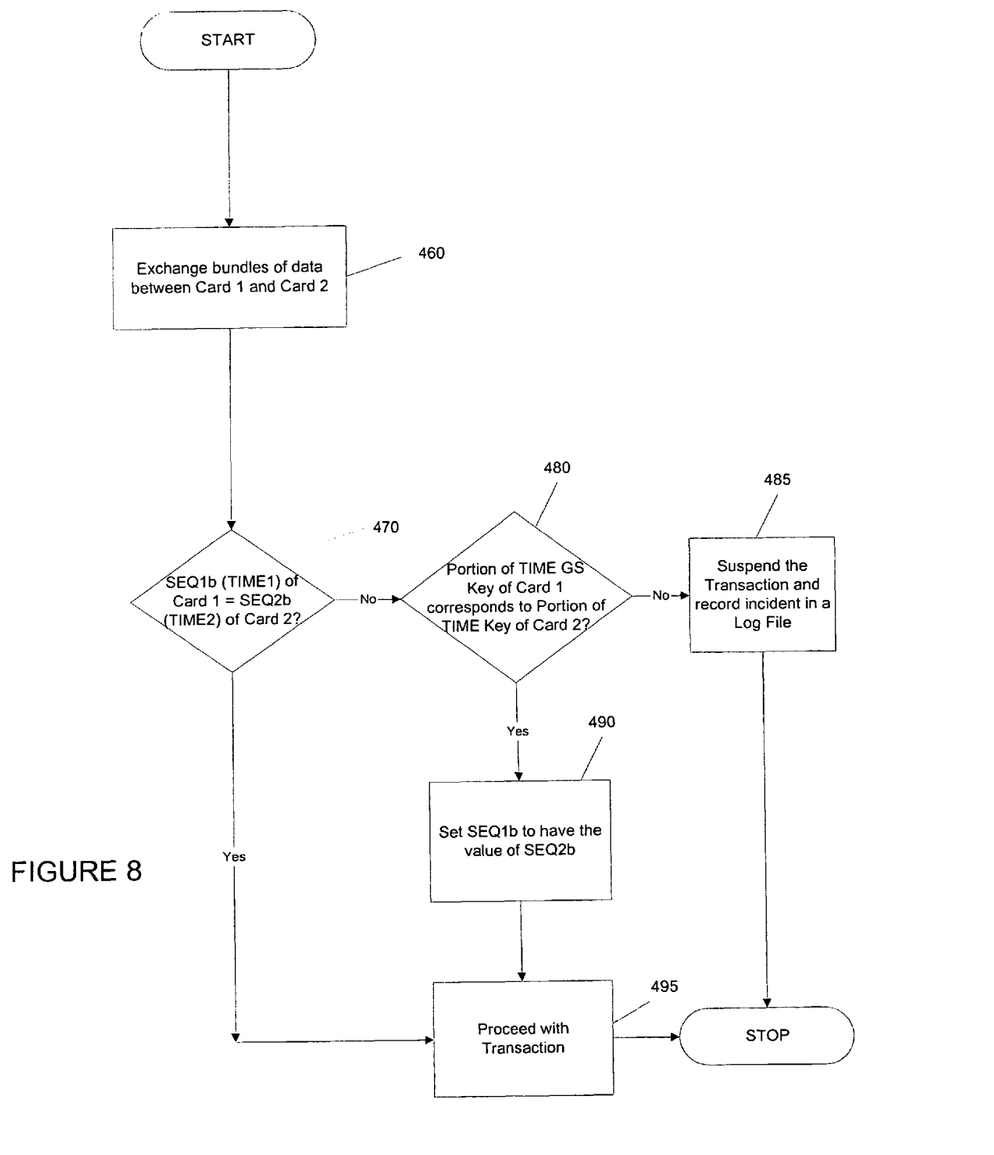
FIG. 8 shows another exemplary embodiment of the method according the present invention for determining the trusted time which utilizes the system of FIG. 6.

FIG. 8 shows a second exemplary embodiment of the method according to the present invention which utilizes the "Sense of Time" scheme. In step 460, the first card 300 and/or the second card 350 initiate a transaction. At that time, the first data 105 of the first card 300 (i.e., the first sequence number SEQ1a, the VTP Key 1, the second sequence number SEQ1b) and the first data 355 of the second card 350 (i.e., the first sequence number SEQ2a, the VTP Key 2, the second sequence number SEQ2b) are exchanged, e.g., via the smart card reading arrangement. In step 470 (and as described above with reference to FIG. 7), the first card 300 and/or the second card 350 determine if the second sequence number SEQ1b of the first card 300 is equal to the second sequence number SEQ2b of the second card 350.

If the second sequence numbers of the first and second cards 300, 350 are not equal, in step 470, a verification is performed in step 480 (by the first card 300 and/or the second card 350) to determine if at least a portion of the TIME GS Key 1 of the first card 300 corresponds to at least a portion of the TIME GS Key 2 of the second card 350. As described above with reference to FIG. 3, the portion of each of the TIME GS Keys being compared can be a public key portion. In an exemplary case, the second sequence number SEQ2b of the second card 350 is newer than the second sequence number SEQ1b of the first card 300. Thus, if the verification fails (e.g., the respective public key portions do not correspond), the transaction is suspended, this failure is recorded in the incident log (step 485), and the communication between the cards is terminated. If the verification in step 480 succeeds (i.e., the respective portions correspond to one another), the second sequence number SEQ1b of the first card 300 is modified to have the second sequence number SEQ2b of the second card 350 (step 490). In addition, the TIME GS Key 2 of the second card 350 may substitute TIME GS Key 1 of the first card 300. Then, in step 495, the transaction is continued. If, in step 470, the second sequence numbers of the first and second cards 300, 350 correspond to one another, the transaction is continued (step 495). For this embodiment, it is preferable if each smart card 300, 350 has a unique TIME global signing key, as well as a unique value transfer protocol key.

It should be appreciated that those skilled in the art will be able to devise numerous systems and processes which, although not explicitly shown or described herein, embody the principles of the invention, and are thus within the spirit and scope of the present invention.

What is claimed is:

1. A method for determining an approximate current time using a first portable device and a second portable device, the first portable device having a first storage device, the second portable device having a second storage device, the first storage device storing thereon a first sequence number, the second storage device storing thereon a second sequence number, wherein the first and second sequence numbers comprise information on a first and a second trusted time embedded in the respective storage devices, the method comprising the steps of:

comparing the first sequence number to the second sequence number, the first sequence number being indicative of a the first trusted time provided on the first portable device, the second sequence number being indicative of a the second trusted time provided on the second portable device; and if the first trusted time is older than the second trusted time, setting the first sequence number to have a value of the second sequence number and conversely, if the second trusted time is older than the first trusted time, setting the second sequence number to have a value of the first sequence number so that the older trusted time information embedded on one of two portable devices is mutually replaced with the newer trusted time information embedded on the other portable device.

2. The method according to claim 1, further comprising the step of:

if the second time is older than the first time, setting the second sequence number to have a value of the first sequence number.

3. The method according to claim 2, further comprising the step of:

after the setting step and if the first time is not equal to the second time, executing an action which is triggered by at least one of the first sequence number and the second sequence number.

4. The method according to claim 3, wherein the first portable device is a first card, and the second portable device is a second card, and further comprising the step of:

after the executing step and if the first time is not equal to the second time, performing a transaction between the first card and the second card.

5. The method according to claim 1, wherein the first portable device is a first card, and the second portable device is a second card, and further comprising the step of:

if the first time is equal to the second time, performing a transaction between the first card and the second card.

6. A method for determining an approximate current time using a first portable device and a second portable device, the first portable device having a first storage device, the second portable device having a second storage device, the first storage device storing thereon a first sequence number and a first key, the second storage device storing thereon a second sequence number and a second key, wherein the first and second sequence numbers comprise information on a first and a second trusted time embedded in the respective storage devices, the method comprising the steps of:
- comparing the first sequence number to the second sequence number, the first sequence number being indicative of the first trusted time provided on the first portable device, the second sequence number being indicative of the second trusted time provided on the second portable device;
- if the second trusted time is newer than the first trusted time, performing a verification using at least one of the first and second keys; and
- setting the first sequence number to have a value of the second sequence number if the verification succeeds; and conversely,
- if the first trusted time is newer than the second trusted time, performing a verification using at least one of the first and second keys; and
- setting the second sequence number to have a value of the first sequence number if the verification succeeds so that the older trusted time information embedded on one of two portable devices is mutually replaced with the newer trusted time information embedded on the other portable device.

7. The method according to claim 6, further comprising the steps of:
- generating the cryptograms by one of the first portable device and the second portable device; and
- verifying the cryptograms using another one of the first portable device and the second portable device.

8. The method according to claim 6, wherein the first key is a first global signing key, and the second key is a global signing key, and wherein the verification is performed by comparing at least one first portion of the first global signing key to at least one second portion of the second global signing key.

9. The method according to claim 8, wherein the verification succeeds when the at least one first portion corresponds to the at least one second portion.

10. The method according to claim 8, wherein each of the first and second global signing keys includes a private key and a public key, and wherein the verification is performed using the respective public keys.

11. The method according to claim 6, wherein the first portable device is a first card, and the second portable device is a second card, and further comprising the step of:
- after the setting step, performing a transaction between the first card and the second card.

12. The method according to claim 6, wherein the first portable device is a first card, and the second portable device is a second card, and further comprising the step of:
- if the verification fails, suspending a transaction between the first card and the second card.

13. The method according to claim 6, further comprising the step of:
- if the verification fails, recording a failure of the verification in at least one of the first storage device and the second storage device.

14. The method according to claim 6, wherein the first portable device is a first card, and the second portable device is a second card, and further comprising the step of:
- if the first time and the second time are equal, performing a transaction between the first card and the second card.

15. The method according to claim 6,
- wherein the first portable device is a first card and the second portable device is a second card,
- wherein the setting step is performed by transmitting an authenticated system message command from the second card to the first card, and
- wherein at least one of the first and second cards sets the second sequence number.

16. The method according to claim 6, wherein the first key is a first global signing key, and the second key is a global signing key, and wherein the first global signing key relates to the first sequence number, and the second global signing key relates to the second sequence number.

17. The method according to claim 6, wherein the first key is a first global signing key, and the second key is a global signing key, and wherein the first global signing key is associated with a first value transfer protocol ("VTP") key, and the second global signing key is associated with a second VTP key, the first VTP key being stored in the first storage device, the second VTP key being stored in the second storage device.

18. The method according to claim 6, wherein each of the first portable device and the second portable device includes a processing device.

* * * * *